United States Patent
Kaiser

(10) Patent No.: US 8,522,255 B2
(45) Date of Patent: Aug. 27, 2013

(54) MULTI-TIERED MESSAGE PARSING

(75) Inventor: Jens Kaiser, Kraichtal (DE)

(73) Assignee: SAP AG, Walldorf (DE)

( * ) Notice: Subject to any disclaimer, the term of this patent is extended or adjusted under 35 U.S.C. 154(b) by 1305 days.

(21) Appl. No.: 11/647,639

(22) Filed: Dec. 29, 2006

(65) Prior Publication Data

US 2008/0163245 A1 Jul. 3, 2008

(51) Int. Cl.
 *G06F 3/00* (2006.01)
 *G06F 9/44* (2006.01)
 *G06F 9/46* (2006.01)
 *G06F 13/00* (2006.01)

(52) U.S. Cl.
 USPC .......................................................... 719/313

(58) Field of Classification Search
 USPC .......................................................... 719/313
 See application file for complete search history.

(56) References Cited

U.S. PATENT DOCUMENTS

| | | | |
|---|---|---|---|
| 7,092,967 B1 * | 8/2006 | Pannala et al. | 1/1 |
| 7,096,224 B2 * | 8/2006 | Murthy et al. | 1/1 |
| 2003/0169730 A1 * | 9/2003 | Narasimhan et al. | 370/355 |
| 2005/0204048 A1 * | 9/2005 | Pujol et al. | 709/229 |
| 2007/0089115 A1 * | 4/2007 | Stern et al. | 719/313 |

OTHER PUBLICATIONS

W3C, Extensible Markup Language (XML) 1.0, 2004, Third Edition, pp. 1-52.*
UN/CEFACT, "Core Components TEchnical Specification—Part 8 of the ebXML Framework", 2003, Version 2.01, pp. 1-113.*
Catania, Barbara, "Lazy XML Updates: Laziness as a Virtue of Update and Structural Join Efficiency", Jun. 2005, ACM, pp. 1-12.*
Noga, Markus, "Lazy XML Processing", 2002, ACM, pp. 1-7.*

* cited by examiner

*Primary Examiner* — Andy Ho
*Assistant Examiner* — Timothy A Mudrick
(74) *Attorney, Agent, or Firm* — Mintz Levin Cohn Ferris Glovsky and Popeo, P.C.

(57) ABSTRACT

Methods and apparatus, including computer program products, for multi-tiered parsing of messages. A message that includes data characterizing values is received, the message is parsed to obtain the values as a first data type, and an instance of a value being of a second data type is generated in response to a request for the value. The requested value is one of the values characterized by the data in the message. The first and second data type are different, and, the second data type is associated with the requested value (e.g., the message may indicate that the first value is of the second data type). The parsing may be considered multi-tiered as parsing to obtain values as a first data type may be considered a first tier and generating an instance of a value as a second data type may be considered a second tier of an overall parsing technique.

17 Claims, 3 Drawing Sheets

MULTI-TIERED MESSAGE PARSING

BACKGROUND

The present disclosure relates to data processing by digital computer, and more particularly to multi-tiered message parsing.

In general, enterprise systems may provide services through messages. For example, a client application may send a message to a server application requesting translation of a document, and, the server application may, in response to the message, translate the document and return a translated version of the document to the client application as a message. For a server application to understand contents of messages that are received, the server application may parse the message in accordance with a format of the message. For example, a message may be in a tree-structured format derived from eXtensible Markup Language ("XML") and the server application may parse the document to develop a tree-structured document object model corresponding to the message. Parsing of messages may consume a lot of computing resources (e.g., processor and memory usage).

SUMMARY

The subject matter disclosed herein provides methods and apparatus, including computer program products, that implement techniques related to multi-tiered message parsing.

In one aspect, a message that includes data characterizing values is received, the message is parsed to obtain the values as a first data type, and an instance of a value being of a second data type is generated in response to a request for the value. The value is one of the values characterized by the data in the message. The first and second data type are different, and, the second data type is associated with the value (e.g., the message may indicate that the value is of the second data type).

In another aspect, a first module may be capable of parsing messages to generate values of a first data type and a second module may be capable of selectively transforming a subset of the values of the first data type to instances of the values having data types associated with the values. In that aspect, at least some of the data types are different from the first data type and the second module selectively transforms the subset of the values in response to a request for the subset of the values.

The subject matter may be implemented as, for example, computer program products (e.g., as source code or compiled code), computer-implemented methods, and systems.

Variations may include one or more of the following features.

A message may be from a service provider providing services to a service consumer, where the service consumer receives the message. A combination of parsing a message and generating instances of values as a second data type may be performed by either a service provider or consumer, or both. For example, messages sent between a service provider and consumer may be parsed and then an instance of a value may be generated based on a request for the value. The parsing may be performed by a component that consumes the message data or another component (e.g., an external parsing engine).

A service provider may be a business object instance in a service-oriented architecture. For example, a business object instance in an enterprise services architecture.

Parsing may include generating values as character strings, where a first data type is a character string data type (e.g., a first data type for all or most message data when a message is received), and generating an instance of the value being of a second data type may include generating the instance as a complex data type not being the character string data type. The complex data may be a data type in accordance with the Core Components Technical Specification (e.g., a global data type as defined by SAP AG of Walldorf, Germany).

Generating an instance of a value (e.g., as a second data type) may be in response to a client application requesting a value. The requested value may be displayed in a user interface to a user (e.g., once it has been transformed to a data type associated with the value).

Parsing a message may include parsing an eXtensible Markup Language-formatted message to obtain character strings that represent data elements of a business object node instance.

A value (e.g., the value requested) may be buffered in a table representing a business object instance, a request for the value may be received, and an instance of the value from the table may be returned.

A value may be buffered in a table representing a business object instance. The table may be structured such that rows correspond to a business object node instance of the business object instance and columns correspond to one or more data elements of business object node instances, the columns being associated with a data type of data elements.

The subject matter described herein may be implemented to realize one or more of the following advantages. An overall parsing technique may include parsing a message to obtain data in the message in a first data type and selectively generating instances of the data in a second data type in response to a request for the data. Thus, rather than transforming all data of a message into data types associated with the data in a single pass, only that data which are requested may be transformed, which may advantageously reduce computing resource usage. For example, a message may be parsed into character strings, with a character string for each data element of the message, and that parsing might not be resource-intensive. Then, in response to a request for a particular data element that is a complex data type, the data element may be transformed from a character string to the complex data type, rather than transforming all of the data elements of the message into each of their associated data types, which might not be character strings. The data may be stored in a table when it is transformed to an associated data type, such that a same portion of data need not be transformed multiple times. As the first data type may be a character string format, many different parsers may be used.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
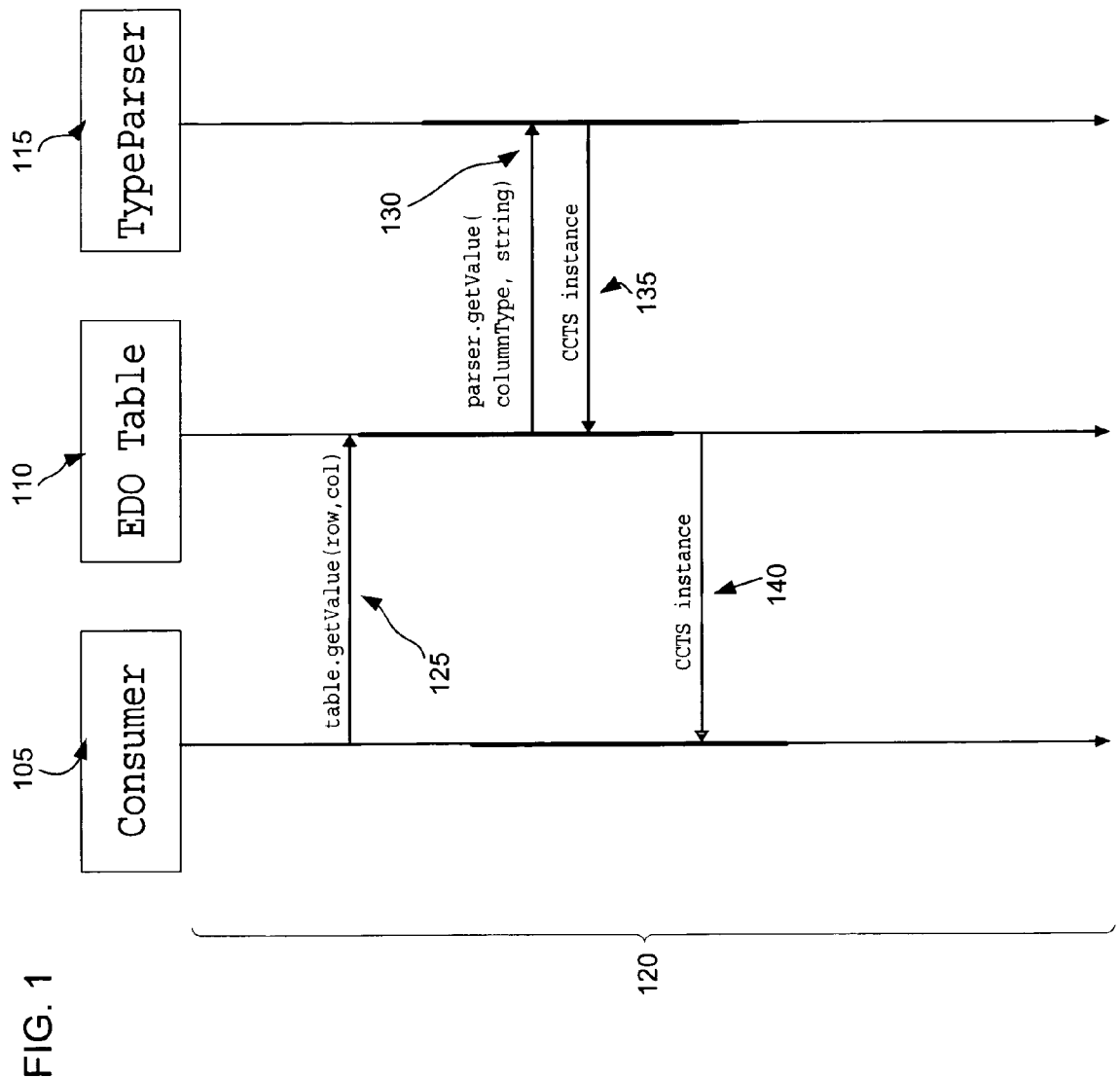
FIG. 1 is a diagram illustrating message transactions that result in parsing of data in a two-tiered message parsing environment.

FIG. 1 is a diagram illustrating message transactions 125, 130, 135, 140 that result in parsing of data in a two-tiered message parsing environment. The environment includes a consumer 105, an EDO (Enterprise Data Object) table 110, and a TypeParser 115. The consumer is a service consumer that may receive messages from a service provider (not shown). In general, a consumer requests services from a service provider that provides services. The services may be web services or enterprise services such as those offered in a services-oriented architecture, such as an enterprise services architecture. The services may relate to a business process that includes messaging transactions representing business events. For example, a message including content that describes a purchase order request may be a representation of a purchase order request. Messages sent between applications may represent business objects, where business objects are containers of data and functionality corresponding to a defined business item (e.g., a representation of a uniquely identifiable business entity described by a structural model, an internal process model, one or more service interfaces, or a combination of the above). For example, a message may represent a purchase order request that is a business object instance that provides services related to a purchase order request.

In general, a message received by the consumer may be parsed such that the EDO table 110 is populated with content that represents message data but is not necessarily in a data type associated with the data of the message. For example, if the message includes data elements corresponding to a business object, the EDO table 110 may be populated with character strings representing the data elements, although the data elements may be associated with an integer data type. The parsing of the message may be handled by the EDO table 110. In variations, another component that is managed by the EDO table 110 may handle the parsing of a message.

In general, data elements in the EDO table 110 are not transformed into a data type associated with the data elements unless the data elements are requested by the consumer 105. Thus, rather than transforming all data elements from a message into associated data types, the transformation of the data may occur at a later time and only those data elements which are requested may be transformed, which may advantageously reduce computing resource usage. For example, a message may be parsed into character strings, with a character string for each data element of the message, which might not be resource-intensive. Then, in response to a request for a particular data element that is an integer, the data element may be transformed from a character string to an integer, rather than transforming all of the data elements of the message into each of their associated data types, which might not be character strings.

The message transactions 125, 130, 135, 140 represent a request for a value of a data element, a request to transform the data element to a data type, and, a return of an instance of the data element having the value. In particular, the first transaction 125 includes a request for a data element in a particular row and column (e.g., "table.getValue(row, col)").

The EDO table 110 may be a data structure that includes an organization of character strings into a table of rows and columns, such that requests for data elements of a message may be in the form of a request of a particular row and column. In the message environment, data related to services may be organized in business objects, which include business object nodes. The business object nodes may include data elements, which may act as a semantically related set of attributes of a business object. The EDO table 110 may include an organization of business object nodes as a row and a data element as a column of the corresponding row. For example, a purchase order business object may include a purchase order root node which has a request identifier as a data element. In that example, the purchase order root node may be a row of the EDO table 110 and a column may include a value corresponding to the request identifier data element. Columns may correspond to data types of values in the columns (e.g., such that values in the table may be address in a row, column fashion by a row identifier corresponding to a unique identifier and a column data type, such as an example row, column pair 901, ShipToLocation, where 901 is an identifier and ShipToLocation is a data type).

An EDO table may be generated for a message and a message may correspond to a business object such that different messages correspond to different EDO tables, and, the consumer may have an understanding of the structure of a business object corresponding to an EDO table such that a consumer may know which row, column pairs correspond to which data elements that are in an EDO table. For example, the consumer 105 may cause the EDO table 110 to be generated for a message representing a purchase order business object and, when requesting data, the consumer 105 may understand that the first row and a column having a data type associated with the value is to be populated with a value corresponding to a data element of that data type that belong to a business object node instance having an identifier corresponding to the row. In some implementations, columns need not be indexed by a data type. For example, the consumer 105 may cause the EDO table 110 to be generated for a message representing a purchase order business object and, when requesting data, the consumer 105 may understand that the first row, column corresponds to a request identifier as all purchase order business objects will be generated as an EDO table having the first row and first column being populated with a value corresponding to a request identifier at that location of the table.

The second transaction 130 involves the EDO table 110 requesting a value from the TypeParser 115. The request may be made if the EDO table 110 does not include a value in a data type associated with the value. For example, in the EDO table 110 may store a data element that has been requested in a data type associated with the data element, and, the value of the data element need not be transformed to the data type. The request for a value from the TypeParser 115 includes an indication of the data type associated with the data element (e.g., "columnType") and a character string representation of the data element.

In response to a request for a value, the TypeParser 115 in a third message transaction 135 responds with the value of the data element in the data type associated with the data element. The data type associated with a data element may be one of the data types associated with the Core Components Technical Specification ("CCTS") developed by UN/CEFACT (United Nations Centre for Trade facilitation and Electronic Business) and ISO (International Organization for Standardization) Technical Committee (TC) 154. The specification of CCTS may define global data types which may be the data elements of business objects (e.g., SAP's Global Data Types, which are a formal description of a structural representation of data used by software programs; actual data values may be seen as instances of (one or more) data types; a data type may restrict the actual data values that may be represented as instances of this type.). Thus, the TypeParser 115 may respond to requests to transform a data type from a first data type, such as a character string, to a second data type, which is associated with a data element. As transforming data elements to an associated CCTS data type may involve application of all the rules of CCTS specification, which may be resource-consuming, using the parser to only obtain the values of data elements that are requested may reduce a significant portion of resource consumption related to handling messages. Rather than returning a CCTS instance, itself, the TypeParser 115 may return a reference to a CCTS instance in the EDO table 110. Also, if the EDO table 110 includes references to character strings, rather than character strings, the EDO table 110 may replace a reference to a character string with a reference to the returned CCTS instance.

In a fourth transaction 140, the EDO table 110 may send an instance of the data element requested in a data type associated with the data element. As parsing of data of a message may be handled by a parser that transforms a message into a first data type and then the data element may later transformed to a second data type associated with the data element, the overall parsing that results in a value of an associated data type may be considered two-tiered.

Although FIG. 1 includes various implementations details, implementations may vary. As examples, different underlying data structures, such as list data structures, may represent the EDO table 110 and a data structure that stores data elements parsed from a message need not be in the form of a table. As another example, the EDO table 110 may store references to data elements rather than the data elements themselves.

Figure 2:
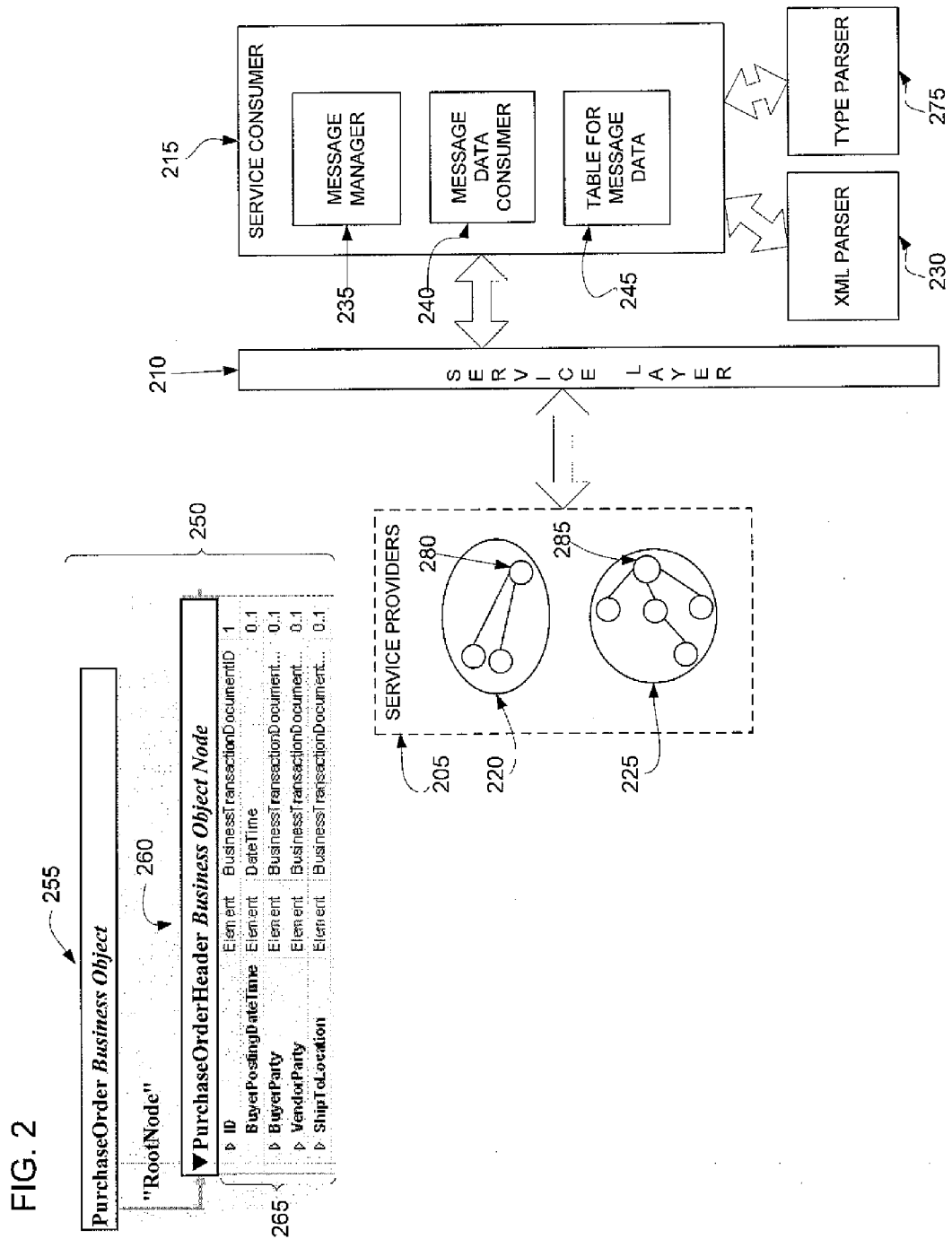
FIG. 2 is a diagram of a messaging system including service providers, a service layer, and a service consumer.

FIG. 2 is a diagram of a messaging system including service providers 205, a service layer 210, and a service consumer 215. In general, the service providers 205 offer services to the service consumer 215 with the help of the service layer 210. As part of providing services, the service providers 205 may send messages that include instances of business object data. For example, purchase order business object data may be sent as a message to the service consumer 215. The messaging system of FIG. 2 may be used for the message transactions of FIG. 1. For example, the service consumer 215 of FIG. 2 may cause message data to be parsed in response to a request for data from a message.

The service providers 205 may include business object instances such as the business object instances 220, 225. The business object instances 220, 225 may consist of a set of business object nodes. Exactly one root business object node may be defined in a business object; and, all other nodes may form a tree of business object nodes with the root node as the root of the tree. For example, the business object instances 220, 225, which are instances of a business object, may have root nodes 280, 285.

A business object node may describe a semantically related set of attributes of a business object, where the attributes of a business object node are defined by global data types. Business object nodes may provide core services (e.g., a service of a business object node according to a standardized set of interface pattern; the set of all core services of a business object node may encapsulate and control a state and behavior of all node instances; e.g., create, update, delete; e.g., creating a purchase order business object node may be a representation of a new real-life purchase order being generated). A node may only be part of one business object (e.g., nodes do not overlap across business objects). Elements of a business object node may be referred to as data elements of a business object instance (e.g., for a runtime instance of a business object).

FIG. 2 includes a design-time representation 250 of a business object. The design-time representation 250 provides a visual representation of a model of a business object instance. In the design-time representation, the business object 255 PurchaseOrder has a root node 260 PurchaseOrderHeader. The root node 260 includes elements 265, such as the element 270 ShipToLocation. Each of the elements may have an associated data type (e.g., global data type or CCTS data type). For example, the element 270 is associated with a BusinessTransactionDocumentShipToLocation data type.

Each of the elements of a business object node may be made up of a combination of more primitive or basic data types. For example, basic data types may be referred to as core component types, which may describe the type of information of a property (the smallest, coherent and consistent unit of data) as part of a CCTS. There may be a limited amount of core types, such as ten different core component types, which may include an amount, a binary object, code, date time, an identifier, an indicator (true/false), a measure, a numeric, a quantity, and text. And, a combination of these may make up the more complex data types corresponding to an element. Because complexity may be involved in the make-up of a data type of an element of a business object node instance, transforming information associated with an element to the associated data type may be resource-consuming. A service consumer may retrieve data from a service provider as an instance of a business object node. The business object node instance may hold a list of business object node rows, where a business object node row has a unique node identifier.

The service layer 210 may manage the service providers 205 and other services. In so doing, the service layer 210 provides an interface for interacting with service providers. For example, the service layer 210 may act to invoke a service in response to a request for a service from the service consumer 215. As another example, the service layer 210 may manage routing of messages from service consumers to service providers. The service layer 210 may be advantageous, as the layer 210 may provide a common interface for a service consumer to interact with a variety of service providers that may run on different platforms such that the heterogeneous environment of service providers is simplified for a service consumer. In some implementations, a service layer need not exist.

The service consumer 215 includes a message manager 235, a message data consumer 240, and a table for message data 245. In general, the message data consumer 240 of the service consumer 215 may be a component that is to consume data relating to a service. For example, the message data consumer 240 may be a tool that processes purchase order data. The message data consumer 240 may request services from the message manager 235, which may generate messages to be sent to the service providers 205. To obtain data related to a service, the message data consumer 240 may request data from the table for message data 245.

The message manager 235 may handle generating and receiving of messages for the service consumer 215. For example, the message manager 235 may generate messages that request services from the service providers 205. For example, the service providers 205 may send a purchase order to the service consumer 215, and, the message manager 235 may handle the message. The message manager 235 may cause incoming messages to be parsed by an XML parser (e.g., as the messages may be in an XML format). For example, the message manager 235 may cause the message to be parsed by the XML parser 230. Messages might always be parsed once they are received. For example, a table may be generated for the tree-structured data of each message received. In some implementations, only some messages may cause a corresponding table to be generated.

The XML parser 230 converts message content into character strings, such that data elements of a business object instance are character strings. The character strings, or references to the character strings, may then be returned and used to populate the table for message data 245.

The table for message data 245 stores message data in an organization of rows and columns. A table may exist for each business object instance. Each of the rows in a table may correspond to a business object node instance. The columns may correspond to data elements of a business object node instance. The message data may be stored as references to character strings, character strings, references to a data element instance of a data type associated with the data element, as a data element instance in a data type associated with the data element, or some combination of the above. For example, in response to receiving a message, a table may be populated with references to character strings for data elements. Then, in response to a request for a data element, a character string corresponding to the data element may be transformed to a data type associated with the data element and a reference to that data element instance may be stored in the table. A column may be assigned to a particular data type, such that a data type associated with a data element may be determined by a data type assigned to a column. For example, one data type may be assigned to a column and all data elements that are associated with that data type may be located in that column of a row corresponding to a business object node instance. Consequently, a column structure of a table may mimic a structure of data elements of a business object node instance and a table's structure may depend on a business object instance from which a table is generated.

A type parser 275 may transform a data element from one data type to another. For example, the type parser 275 may generate an instance of a data element based on a character string representation of a data element that is referenced in the table for message data 245. The type parser 275 may transform data into complex data types, such as CCTS instances. This may require the type parser 275 to be capable of understanding CCTS methodology of syntax independent data building blocks that may be combined and customized to suit varied business and information system requirements. For example, the type parser 275 may understand specific enumerated data types or the type parser may be able to understand complex data types that have been constructed according to the CCTS methodology. In contrast to transforming all message data content to associated data types, the type parser 275 may only be used to transform data elements that are requested by the message data consumer 240.

In some implementations, a parser other than the XML parser may be used to parse the data from a message, depending on a format of messages. Also, the XML parser may convert message data into a data type other than a character string. Although the description of FIG. 2 uses business object and business object nodes as the organization of information that is to be parsed, other schemas for storing information may be used and the components may be adapted accordingly.

Figure 3:
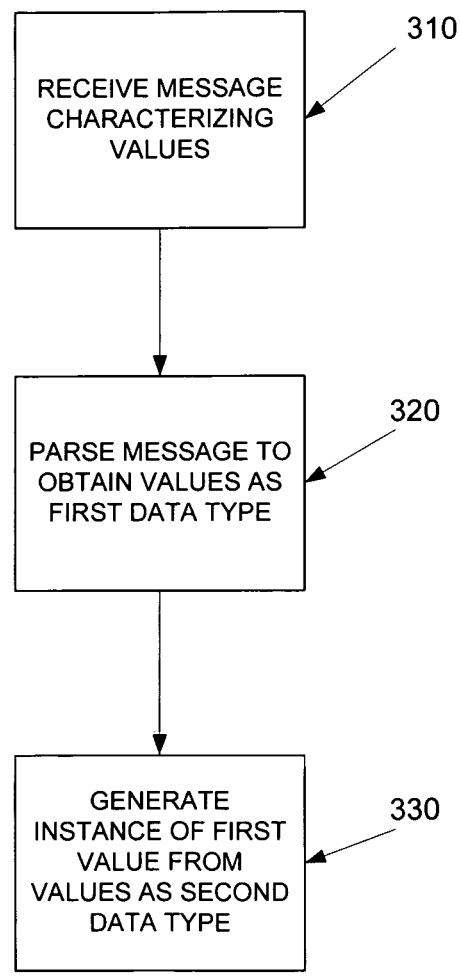
FIG. 3 is a flowchart illustrating a process of parsing a message.

FIG. 3 is a flowchart illustrating a process of parsing a message. In general, a message characterizing values is received (310), a message is parsed to obtain values as a first data type (320), and an instance of a first value as a second data type is generated (330). The process may be performed in a messaging system similar to the system of FIG. 2 or in an environment similar to the environment of FIG. 1.

The message characterizing values (310) may be a message that includes a business object instance, which may be in a tree-structured format, such as XML. The values may be characterized by text in the message. For example, an XML tag may characterize a value of a data element of a business object node instance. For example, "<ConstructionDateTime timeZoneCode="SAP_CET" daylightSavingTimeIndicator="TRUE">2002-04-19T15: 30:00</ConstructionDateTime>" may describe an instance of a ConstructionDateTime data type for a data element of a business object node instance. In some implementations, formats other than XML may be used for a message and the data in the message need not be a characterization of values of data elements in a business object node instance. For example, data structures other than business objects may be used.

Parsing a message to obtain values as a first data type (320) may include, as an example, using an XML parser to parse a message in XML-format to obtain character strings of data elements in a message. The message may be parsed by a recipient of the message. A tool that may consume the message may parse the message or another tool may be called to parse the message.

Data values obtained from a message may be stored in a table. For example, a type of table may exist for each type of business object. A type of table to be populated may match the structure of a type of business object instance characterized by the message. For example, rows may exist for each business object node instance, columns may exist for data elements, and the columns may be of a data type associated with the data element of the business object. A table may be populated with references to character strings of data elements from the message. In some implementations, an entire business object instance need not be contained in a table. For example, a business object node instance may be sent in a message and a combination of nodes may make up a table. The structure of a table may be dictated by a message. For example, a format of rows and columns may be described in a message with XML tags for rows and columns. Such an approach may make parsing of the message and populating of a table less-resource-consumptive (e.g., as the process may be considered simple). For example, a parser may read and XML document and split the data into character strings based on row and column tags, and the row and column tags may dictate the location of character strings in the table.

Generating an instance of a first value as a second data type (330) is based on the parsing of a message to obtain values as a first data type (320). For example, if the values that are obtained from a message are referenced in a table, values that are character strings may be transformed to a data type associated with the value based on a column type of a table in which the character string is stored. For example, a reference to a DataTime data element may be stored as a character string in a column of a table corresponding to a DateTime data type. The character string may be transformed to a DateTime CCTS-compliant data type (e.g., by generating an instance of the value as a DateTime data type). Transforming from a first data type to a second data type may involve going through a specification of rules for the second data type to construct the instance of the value as the second data type. As the process may be burdensome, if many rules of the specification exist, generating the instance of the value as the second data type only when demanded (e.g., requested) may be advantageous.

Thus, the instance of the value requested as a second data type may only be generated in response to a request for the item. For example, in response to a request from a service consumer for the data. The instance of the value as the second data type may be stored in a table which stored another version of the data. For example, a character string representation of a data element may be replaced with a reference to a value being an instance of a data type associated with the data element. By having a same table store values of the first data type, and storing transformed values any other number of data types, values in the table may be type-checked to determine whether a value has already been transformed and stored in the table. If so, that version of the value may be used rather than transforming the value again.

The environment or system in which the process of FIG. 3 may be performed may implement an enterprise services architecture (e.g., a type of service-oriented architecture). The message and data contained in the message may relate to a service offered by a business object at an application different from an application that consumes the message (e.g., at an application that resides at a different company). The messages may be application to application messages, business to business messages, or some combination (e.g., a business to application message).

As business object instances may be made of complex data types, parsing a message containing business object data in a first instance to a first data type, such as character strings, might not be resource-intensive; whereas, fully-parsing all data to data types that are associated with the data may be resource-intensive. Thus, dividing tasks such that all business data need not be parsed to associated data types may save computing resources (e.g., processor computing cycles). This may especially be significant in an enterprise services architecture environment where a high volume of messages may be received for a variety of transactions. And, this may be even more significant in a system where a large volume of data elements from messages are not consumed. In an enterprise services architecture, an enterprise service may be a compound service used in the execution of a business process step, having a significant meaning and impact for the business of the enterprise, fulfilling strict rules regarding version compatibility and stability defined by the enterprise service interface, and built on web service technology.

For example, a when rendering enterprise data to a table or form a view in a user interface, only a specified set of columns and rows might be displayed (e.g., twenty rows from a set of thousands of rows). As another example, only a portion of business data may be modified and transferred back to a provider, such that the provider might need to access only a fraction of message data to persist modifications to the business data. In some instances, if data elements are never to be accessed, the data from a message might never be transformed to associated data types.

The subject matter described herein may be implemented in digital electronic circuitry, or in computer software, firmware, or hardware, including the structural means disclosed in this specification and structural equivalents thereof, or in combinations of them. The subject matter described herein may be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file. A program may be stored in a portion of a file that holds other programs or data, in a single file dedicated to the program in question, or in multiple coordinated files (e.g., files that store one or more modules, sub-programs, or portions of code). A computer program may be deployed to be executed on one computer or on multiple computers at one site or distributed across multiple sites and interconnected by a communication network.

The processes and logic flows described in this specification, including the method steps of the subject matter described herein, may be performed by one or more programmable processors executing one or more computer programs to perform functions of the subject matter described herein by operating on input data and generating output. The processes and logic flows may also be performed by, and apparatus of the subject matter described herein may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the subject matter described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The subject matter described herein may be implemented in a computing system that includes a back-end component (e.g., a data server), a middleware component (e.g., an application server), or a front-end component (e.g., a client computer having a graphical user interface or a web browser through which a user may interact with an implementation of the subject matter described herein), or any combination of such back-end, middleware, and front-end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other in a logical sense and typically interact through a communication network. The relationship of client and server arises by virtue of computer programs running on the respective computers and having a client-server relationship to each other.

Although ordinal numbers such as first, second, and the like may, in some situations, relate to an order; as used in this document ordinal numbers do not imply an order. For example, a first data type is not necessarily ordered before a second data type and the ordinal numbers may be used simply to distinguish between items discussed.

The subject matter described herein has been described in terms of particular embodiments, but other embodiments may be implemented and are within the scope of the following claims. For example, operations may differ and still achieve desirable results. In certain implementations, multitasking and parallel processing may be preferable. Other embodiments are within the scope of the following claims.

What is claimed is:

1. A computer-implemented method comprising:
receiving, at a service consumer implemented on a client computing system from a service provider implemented on a server computing system, a message comprising data values associated with a business object;
transforming, at the service consumer, a portion of the message into first data values of a first data type, the first data values corresponding to a first business object instance, the first data type comprising character strings representing data elements of at least one business object node instance, the first data type being different than a second data type;
storing the first data values in a table, the table being of a type associated with the business object, wherein each business object node instance corresponds to a row of the table and each column corresponds to the data elements;
determining, at the service consumer, by type checking the first data values in response to a request for the first data values presented in the second data type, whether the first data values have already been transformed from the first data type to the second data type;
transforming, at the service consumer, the first data values into the second data type based upon the determination that the first data values have not been previously transformed from the first data type to the second data type and based upon a the plurality of rules; and
replacing the first data values stored in the table in the first data type with the first data values transformed from the first data type to the second data type,
wherein the computing resources utilized by the service consumer are reduced by transforming fewer than all of the data values from the first data type to the second data type.

2. A method in accordance with claim 1, wherein the second data type comprises a complex data type not being the character string data type.

3. A method in accordance with claim 1, further comprising:
buffering the first data values in the table;
receiving the request for the first data values; and
returning an instance of the first data values from the table.

4. A method in accordance with claim 1, wherein the service provider is a business object in a service-oriented architecture.

5. A method in accordance with claim 1, wherein the second data type is a complex data being a data type in accordance with the Core Components Technical Specification.

6. A method in accordance with claim 1, wherein the method further comprises displaying the first data values in a user interface to a user.

7. A method in accordance with claim 1, wherein the transforming the message comprises parsing an eXtensible Markup Language-formatted message to obtain the character strings that represent the data elements of the at least one business object node instance.

8. A method in accordance with claim 1, wherein the service provider is a business object in a enterprise services architecture, and wherein the second data type is a complex data in accordance with the Core Components Technical Specification.

9. A non-transitory computer program product, tangibly embodied in an information carrier, the computer program product being operable to cause data processing apparatus to perform operations comprising:
receiving, at a service consumer implemented on a client computing system from a service provider implemented on a server computing system, a message comprising data values associated with a business object;
transforming, at the service consumer, a portion of the message into first data values of a first data type, the first data values corresponding to a first business object instance, the first data type comprising character strings representing data elements of at least one business object node instance, the first data type being different than a second data type;
storing the first data values in a table, the table being of a type associated with the business object, wherein each business object node instance corresponds to a row of the table and each column corresponds to the data elements;
determining, at the service consumer, by type checking the first data values in response to a request for the first data values presented in the second data type, whether the first data values have already been transformed from the first data type to the second data type;
transforming, at the service consumer, the first data values into the second data type based upon the determination that the first data values have not been previously transformed from the first data type to the second data type and based upon a plurality of rules; and
replacing the first data values stored in the table in the first data type with the first data values transformed from the first data type to the second data type,
wherein the computing resources utilized by the service consumer are reduced by transforming fewer than all of the data values from the first data type to the second data type.

10. A product in accordance with claim 9, wherein the second data type comprises a complex data type not being the character string data type.

11. A product in accordance with claim 9, wherein the operations further comprise:
buffering the first data values in the table associated with the business object;
receiving the request for the first data values; and
returning an instance of the first data values from the table.

12. A product in accordance with claim 9, wherein the service provider is a business object in a enterprise services architecture, and wherein the second data type is a complex data in accordance with the Core Components Technical Specification.

13. An apparatus comprising:
at least one processor; and
at least one memory, wherein the at least one processor and the at least one memory are configured to provide operations comprising:
receiving, at a service consumer implemented on a client computing system from a service provider implemented on a server computing system, a message comprising data values associated with a business object;
transforming, at the service consumer, a portion of the message into first data values of a first data type, the first data values corresponding to a first business object instance, the first data type comprising character strings representing data elements of at least one business object node instance, the first data type being different than a second data type;

storing the first data values in a table, the table being of a type associated with the business object, wherein each business object node instance corresponds to a row of the table and each column corresponds to the data elements;

determining, at the service consumer, by type checking the first data values in response to a request for the first data values presented in the second data type, whether the first data values have already been transformed from the first data type to the second data type;

transforming, at the service consumer, the first data values into the second data type based upon the determination that the first data values have not been previously transformed from the first data type to the second data type and based upon a plurality of rules; and replacing the first data values stored in the table in the first data type with the first data values transformed from the first data type to the second data type, wherein the computing resources utilized by the service consumer are reduced by transforming fewer than all of the data values from the first data type to the second data type.

14. An apparatus in accordance with claim 13, wherein the second data type comprises a complex data type not being the character string data type.

15. An apparatus in accordance with claim 13, further comprising:
buffering the first data values in the table associated with the business object;
receiving request for the first data values; and
returning an instance of the first data values from the table.

16. An apparatus in accordance with claim 13, wherein the service provider is a business object in a service-oriented architecture.

17. An apparatus in accordance with claim 13, wherein the service provider is a business object in a enterprise services architecture, and wherein the second data type is a complex data in accordance with the Core Components Technical Specification.

* * * * *